(12) United States Patent
Zanarella

(10) Patent No.: US 10,414,569 B2
(45) Date of Patent: Sep. 17, 2019

(54) METHOD FOR PRODUCING A LAMINATE FOR MAKING CLOSING ELEMENTS FOR CONTAINERS OR RECEPTACLES, LAMINATE AND CONTAINER

(71) Applicant: SMILESYS S.R.L., Milan (IT)

(72) Inventor: Claudio Ernestino Zanarella, Campo San Martino (IT)

(73) Assignee: SMILESYS S.P.A., Milan (IT)

(*) Notice: Subject to any disclaimer, the term of this patent is extended or adjusted under 35 U.S.C. 154(b) by 245 days.

(21) Appl. No.: 15/128,275

(22) PCT Filed: Mar. 24, 2015

(86) PCT No.: PCT/IB2015/052129
§ 371 (c)(1),
(2) Date: Sep. 22, 2016

(87) PCT Pub. No.: WO2015/145338
PCT Pub. Date: Oct. 1, 2015

(65) Prior Publication Data
US 2017/0096276 A1 Apr. 6, 2017

(30) Foreign Application Priority Data

Mar. 27, 2014 (IT) .............................. MI2014A0530

(51) Int. Cl.
*B65D 77/00* (2006.01)
*B29C 65/00* (2006.01)
(Continued)

(52) U.S. Cl.
CPC .......... *B65D 77/2096* (2013.01); *B29C 65/02* (2013.01); *B29C 65/48* (2013.01);
(Continued)

(58) Field of Classification Search
CPC ......... Y10T 156/1057; Y10T 156/1064; Y10T 156/1082; B32B 38/0004
See application file for complete search history.

(56) References Cited

U.S. PATENT DOCUMENTS 4,636,273 A * 1/1987 Wolfersperger ..... B65D 77/206
156/244.11
5,125,529 A * 6/1992 Torterotot ............ B65D 77/206
215/232

(Continued)

FOREIGN PATENT DOCUMENTS

EP 0661154 A1 * 7/1995
EP 0661154 A1 7/1995
(Continued)

OTHER PUBLICATIONS

International Search Report dated Jul. 15, 2015 for related PCT Application No. PCT/IB2015/052129.

*Primary Examiner* — Linda L Gray
(74) *Attorney, Agent, or Firm* — Shuttleworth & Ingersoll, PLC; Timothy J. Klima

(57) ABSTRACT

A container including a containment wall, defining an internal containment volume and including a free edge, a closing element including a welding layer welded onto the free edge of the wall and a front layer defining an outer surface of the container. An intermediate layer of removable self-adhesive is spread onto an adhesion portion of mutually coupled surfaces of the welding layer and front layer. An opening line adapted to define an access window is obtained through an incision in a stretch of thickness of the welding layer splitting the welding layer into a welding portion adapted to be welded to the container and an opening portion corresponding to the access window, with reference to an assembled configuration on the container. The incision is
(Continued)

made to allow the detachment of the opening portion from the welding portion while the closing element is opened.

7 Claims, 7 Drawing Sheets

(51) Int. Cl.
| | |
|---|---|
| *B32B 7/00* | (2019.01) |
| *B65D 65/00* | (2006.01) |
| *B65D 77/20* | (2006.01) |
| *B29C 65/02* | (2006.01) |
| *B29C 65/48* | (2006.01) |
| *B65D 65/40* | (2006.01) |
| *B32B 7/14* | (2006.01) |
| *B29L 31/00* | (2006.01) |

(52) U.S. Cl.
CPC ............... *B32B 7/14* (2013.01); *B65D 65/40* (2013.01); *B65D 77/2056* (2013.01); *B29L 2031/712* (2013.01); *B32B 2250/02* (2013.01); *B32B 2307/50* (2013.01); *B32B 2307/58* (2013.01); *B32B 2435/02* (2013.01); *B32B 2439/00* (2013.01); *B32B 2439/70* (2013.01); *B65D 2577/2033* (2013.01); *B65D 2577/2091* (2013.01); *Y10T 156/1057* (2015.01); *Y10T 156/1064* (2015.01); *Y10T 156/1082* (2015.01)

(56) References Cited

U.S. PATENT DOCUMENTS

| | | | |
|---|---|---|---|
| 5,513,781 A * | 5/1996 | Ullrich | B65D 47/185 215/232 |
| 6,056,141 A | 5/2000 | Navarini et al. | |
| 2004/0180118 A1* | 9/2004 | Renger | B29C 65/743 426/106 |
| 2014/0097185 A1* | 4/2014 | Sato | B29C 65/18 220/266 |

FOREIGN PATENT DOCUMENTS

| | | |
|---|---|---|
| EP | 0905048 A1 | 3/1999 |
| EP | 1449789 A1 | 8/2004 |

* cited by examiner

METHOD FOR PRODUCING A LAMINATE FOR MAKING CLOSING ELEMENTS FOR CONTAINERS OR RECEPTACLES, LAMINATE AND CONTAINER

This application is the National Phase of International Application PCT/IB2015/052129 filed Mar. 24, 2015 which designated the U.S.

This application claims priority to Italian Patent Application No. MI2014A000530 filed Mar. 27, 2014, which application is incorporated by reference herein.

The present invention relates to a method for producing a laminate for making closing elements for containers or receptacles.

The present invention further relates to a laminate and a container.

In particular the present invention is intended for the field of containers or receptacles for food. The containers may have various shapes and be made of various materials for example plastic such as APET (amorphous polyester), PS (polystyrene also foam), PP (polypropylene), PVC. Alternatively the containers may be made with composite materials, for example PVC with PE, APET with PE, etc. The containers may even be made of card treated with water resistant or fat resistant paints or coupled with a thin layer of film. As well as the examples reported above, the containers may be made of metal materials, for example aluminium or treated iron plate.

Containers are known that are closed at the top with plastic films welded along a free edge of the container itself. Such containers are used in particular for the retail sale of food products.

A drawback common to known containers is the difficulty to open the plastic film, which is generally overcome by cutting the plastic film with scissors or knives.

A further drawback of known containers is the impossibility to reclose the container itself after opening it using the same closing plastic film.

In this context, the technical task underpinning the present invention is to provide a method, a laminate and a container which obviate the drawbacks of the prior art as cited above.

In particular, an object of the present invention is to provide a method for producing a laminate for making closing elements for containers or receptacles, which enables, in the finished product, the container to be easily opened and closed various times.

A further object of the present invention is to propose a method that can be adapted to the systems already in use.

Yet another object of the present invention is to propose a container with a closure that is rigid and planar also during opening, that is preferably completely recyclable and that is applicable to all types of containers on the market.

The technical task specified and one or more of the objects specified are substantially reached by a method for producing a laminate for making closing elements for containers or receptacles, comprising technical characteristics as disclosed herein. Likewise, the technical task set and the objects specified are substantially attained by a laminate and a container comprising technical characteristics as disclosed herein.

Different embodiments are disclosed herein.

In accordance with a first aspect, the present invention relates to a method for producing a laminate for making closing elements for containers or receptacles comprising at least one first layer or welding layer adapted to be welded to a free edge of the container and at least one second layer or front layer for example adapted to define an external surface of said container, said method comprising:

providing said welding layer and said front layer;

coupling said welding layer to said front layer through an intermediate layer of removable self-adhesive spread onto at least one adhesion portion of mutually coupled surfaces of said welding layer and of said front layer;

making an incision in at least one stretch of the thickness of the welding layer along at least one opening line adapted to define an access window of a closing element, wherein said incision divides the welding layer between a welding portion adapted to be welded to the container and an opening portion corresponding to said access window, with reference to an assembled configuration on the container, said incision being made so as to allow the detachment of said opening portion from said welding portion while said closing element is opened.

In accordance with a second aspect the present invention relates to a laminate for making closing elements for containers or receptacles comprising:

at least one first layer or welding layer adapted to be welded to a free edge of the container.

at least one second layer or front layer adapted for example to define an external surface of said container, an intermediate layer of removable self-adhesive spread onto at least one adhesion portion of mutually coupled surfaces of said welding layer and of said front layer;

at least one opening line adapted to define an access window of a closing element wherein said opening line is obtained through an incision in at least one stretch of the thickness of the welding layer therefore the welding layer is split into a welding portion adapted to be welded to the container and an opening portion corresponding to said access window, with reference to an assembled configuration on the container, said incision being made so as to allow the detachment of said opening portion from said welding portion while the closing element is opened.

According to a further aspect, the present invention relates to a container comprising:

a containment wall defining an internal containment volume and comprising a free edge and a closing element comprising at least one first layer or welding layer welded to said free edge of the containment wall and at least one second layer or front layer defining for example an external surface of said container, said closing element being obtained starting from a laminate made with a method according to an aspect of the present invention or a laminate according to an aspect of the present invention.

In one or more of the indicated aspects, the present invention may comprise one or more of the characteristics set forth below.

Preferably said incision is made in the whole thickness of the welding layer and preferably affects at least one first stretch of the thickness of the front layer.

Preferably said welding portion surrounds said opening line and said opening portion and preferably said welding portion defines a closed perimeter and said opening line defines an open perimeter.

Preferably providing said welding layer and said front layer comprises:

continuously making said welding layer and said front layer advance along respective longitudinal directions, for example, by unwinding them from respective reels;

continuously coupling said welding layer to said front layer to form a continuous laminate extending along its own longitudinal direction, and making a plurality of opening lines along said longitudinal direction each adapted to define an access window of a closing element of a container.

Preferably said intermediate layer of removable self-adhesive is spread onto said adhesion portion leaving at least one portion free from removable self-adhesive.

Preferably said adhesion portion of the intermediate layer covers said opening portion and extends at least partially onto said welding portion of said welding layer, beyond said opening line with respect to said opening portion, said portion free from removable self-adhesive corresponding to a stretch of said welding portion.

Preferably said portion free from removable self-adhesive is arranged at one side of said laminate and extends continuously along said longitudinal direction of the laminate.

Preferably said intermediate layer of removable self-adhesive is spread at a plurality of adhesion portions alternating along the longitudinal direction of the laminate with portions free from removable self-adhesive arranged transversally to said longitudinal direction, each delimiting a closing element.

Preferably a further incision is made in at least one stretch of the thickness of the welding layer along at least one separation line. Said welding portion adapted to be welded to the container is arranged between at least one portion of said opening line and said separation line. Preferably said further incision is made in the whole thickness of the welding layer and affects at least one second stretch of the thickness of the front layer.

Preferably said separation line extends between said portion free from removable self-adhesive and said adhesion portion.

Preferably a plurality of separation lines is made, each at a closing element, wherein each welding portion adapted to be welded to the container is arranged between at least one portion of an opening line and a separation line.

Preferably an additional adhesive layer can be applied between the welding layer and the front layer preferably at the welding portion. The additional adhesive layer is configured to create a sealing of the container.

Preferably said incision is made in the whole thickness of the welding layer and preferably affects at least one first stretch of the thickness of the front layer.

Preferably said welding portion surrounds said opening line and said opening portion. Preferably said welding portion defines a closed perimeter and said opening line defines an open perimeter.

Preferably said welding layer and said front layer have a prevalent extension along respective longitudinal directions forming a continuous laminate extending along its own longitudinal direction. Said laminate comprises a plurality of opening lines each adapted to define an access window of a closing element of a container.

Preferably said at least one adhesion portion and at least one portion free from removable self-adhesive are provided.

Preferably said adhesion portion of the intermediate layer covers said opening portion and extends at least partially onto said welding portion of said welding layer, beyond said opening line with respect to said opening portion. Said portion free from removable self-adhesive corresponds to a stretch of said welding portion.

Preferably said portion free from removable self-adhesive is arranged at one side of said laminate and extends continuously along said longitudinal direction.

Preferably a plurality of adhesion portions is provided alternating along the longitudinal direction of the laminate with portions free from removable self-adhesive arranged transversally to said longitudinal direction.

Preferably at least one separation line is provided, obtained through a further incision in at least one stretch of the thickness of the welding layer. Said welding portion adapted to be welded to the container is arranged between at least one portion of said opening line and said separation line. Preferably said further incision is made in the whole thickness of the welding layer and affects at least one second stretch of the thickness of the front layer.

Preferably said separation line extends between said portion free from removable self-adhesive and said adhesion portion.

Preferably an additional adhesive layer is arranged between the welding layer and the front layer preferably at the welding portion. Said additional adhesive layer is configured to create a sealing of the container.

Preferably a plurality of separation lines is made, each at a closing element, wherein each welding portion adapted to be welded to the container is arranged between at least one portion of an opening line and a separation line.

Further characteristics and advantages of the present invention will become more apparent from the following indicative, and hence non-limiting, description of a preferred, but not exclusive, embodiment as illustrated in the accompanying drawings, in which.

Figure 1:
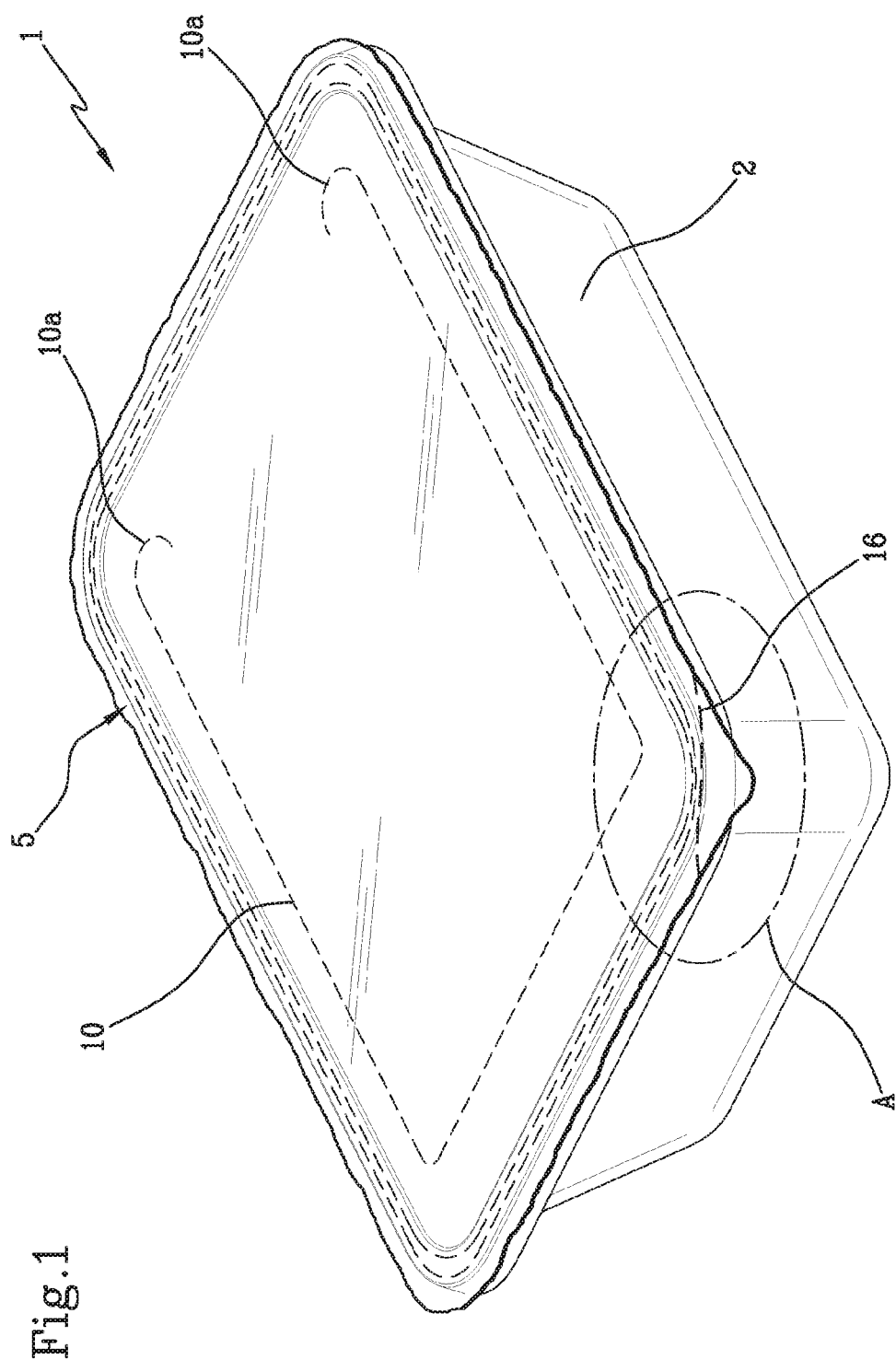
FIG. 1 is a schematic perspective view of a container according to the present invention.
Figure 2:
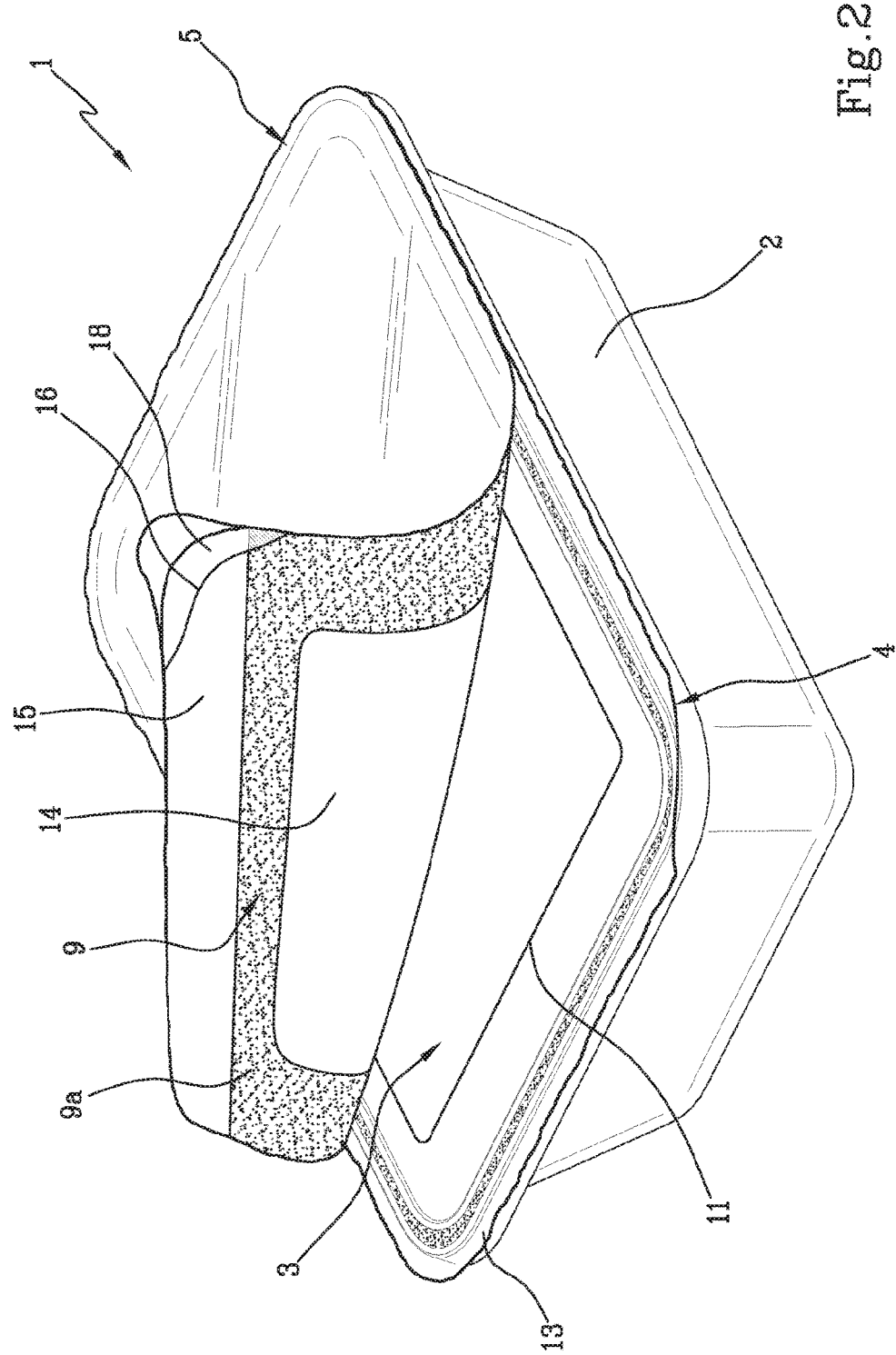
FIG. 2 is a schematic perspective view of the container of FIG. 1 in a different operating condition.
Figure 3:
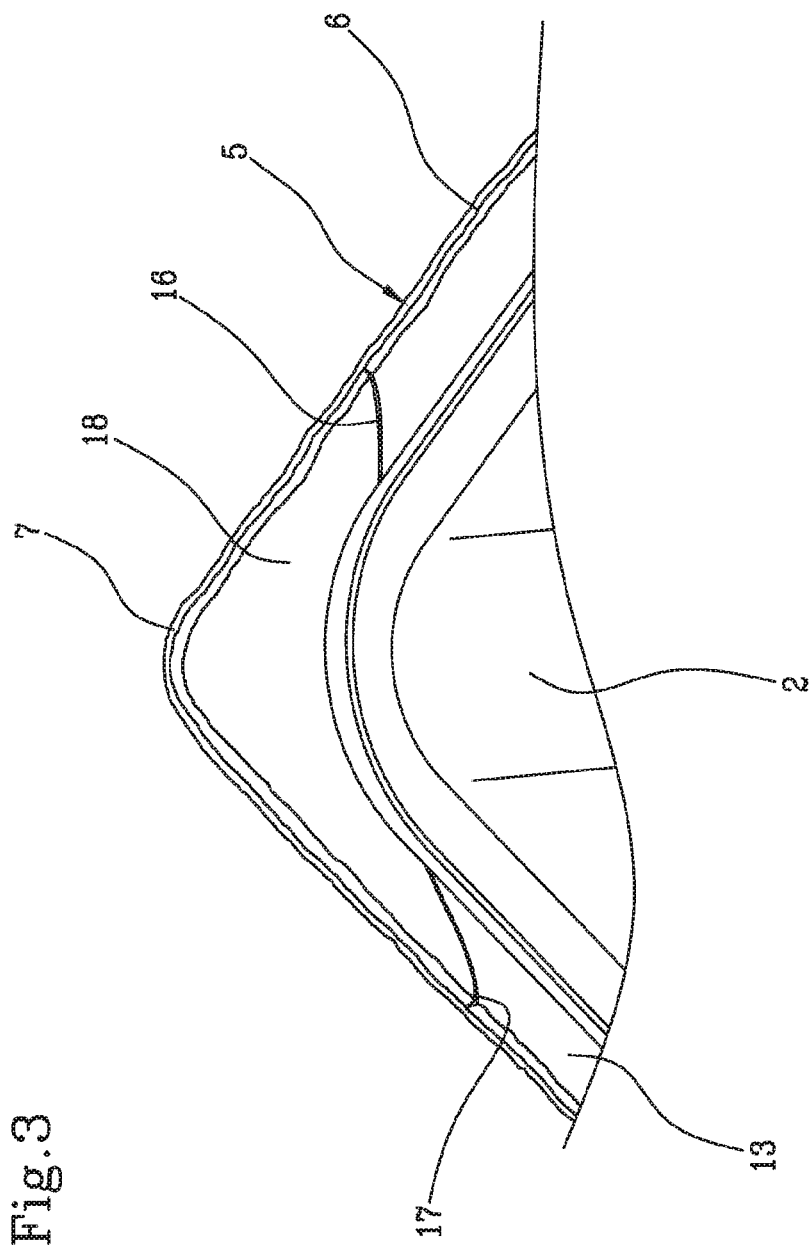
FIG. 3 is an enlarged view of detail A of FIG. 1 seen from below.
Figure 4:
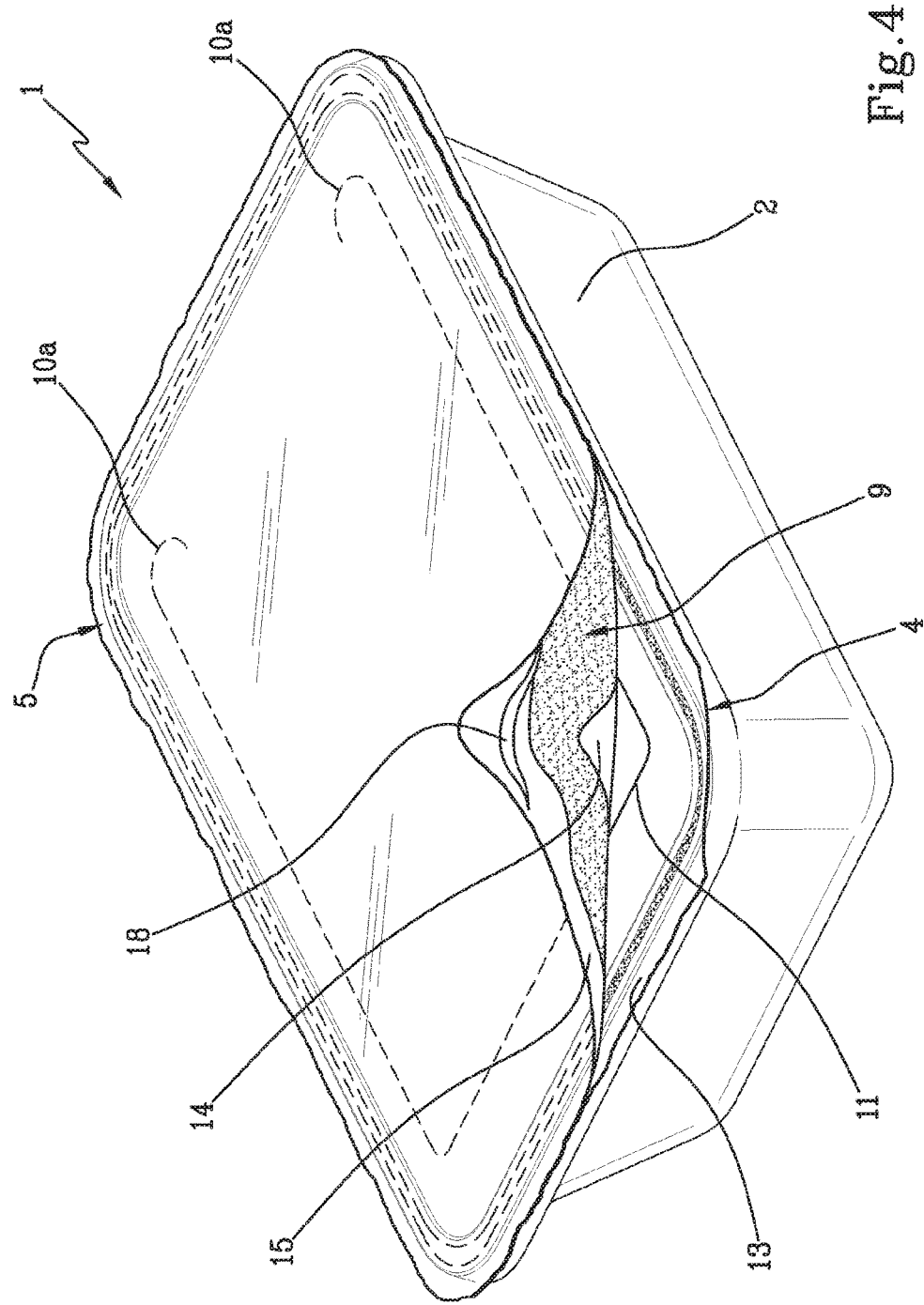
FIG. 4 is a schematic perspective view of the container of FIG. 1 in a different operating condition.
Figure 5:
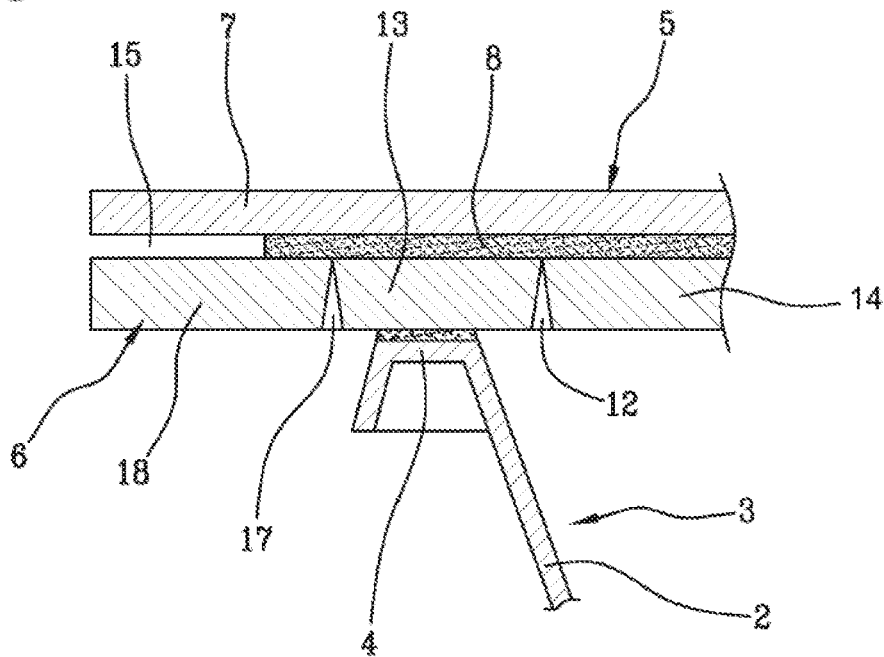
FIG. 5 is a sectional view of a detail of a container according to the present invention.

With reference to the appended FIGS. 1-7, 1 indicates overall a container comprising a containment wall 2 defining an internal containment volume 3.

The containment wall 2 comprises a free edge 4 that for example delimits an access opening to the internal containment volume 3. The containment volume 3 is closed by a closing element 5 comprising at least one first layer or welding layer 6 welded to the free edge 4 of the containment wall 2 and at least one second layer or front layer 7 arranged above the welding layer and preferably defining an outer surface of the container 1.

8 indicates an intermediate layer of removable self-adhesive spread onto at least one adhesion portion 9 of mutually coupled surfaces of the welding layer 6 and of the front layer 7.

The closing element 5 comprises at least one opening line 10 adapted to define an access window 11 to the internal containment volume 3. In particular the opening line 10 is obtained through an incision 12 of at least one stretch of the thickness of the welding layer 6. Preferably the incision 12 is made in the whole thickness of the welding layer 6 and may affect at least one first stretch of the thickness of the front layer 7.

The incision 12 splits the welding layer 6 into a welding portion 13 welded to the containment wall 2 and an opening portion 14 corresponding to the access window 11, with reference to an assembled configuration on the container.

In particular the incision 12 allows the opening portion 14 to be detached from the welding portion 13 while the closing element 5 is opened, as will be described in detail below.

Preferably the welding portion 13 surrounds the opening line 10 and the opening portion 14. In accordance with a possible embodiment the welding portion 13 defines a closed perimeter, the same shape as the free edge 4 of the container, and the opening line 10 defines an open perimeter. Preferably the opening line 10 comprises curved ends 10a to prevent the complete detachment of the opening portion 14 from the welding portion 13.

In accordance with a possible embodiment of which the appended figures define a non-limiting example, the intermediate layer 8 of removable self-adhesive does not cover the whole extension of the closing element 5. In other words in the closing element 5 at least one adhesion portion 9 and at least one portion free from removable self-adhesive 15 can be found.

In accordance with a possible embodiment, the adhesion portion 9 of the intermediate layer 8 covers the opening portion 14 and extends at least partially onto the welding portion 13 of the welding layer 6, beyond the opening line 10 with respect to the opening portion 14. In other words the adhesion portion 9 has a larger planar extension that the opening portion 14 of the welding layer 6.

Likewise, the portion free from removable self-adhesive 15 corresponds to a stretch of the welding portion 13. In other words the welding portion 13 faces both a stretch of the adhesion portion 9 and at least one stretch of the portion free from removable self-adhesive 15.

In accordance with a possible embodiment of which the appended figures illustrate a non-limiting example, the closing element 5 comprises at least one separation line 16 obtained through a further incision 17 in at least one stretch of the thickness of the welding layer 6. Advantageously the welding portion 13 adapted to be welded to the container is arranged between at least one portion of the opening line 10 and the separation line 16.

Preferably the further incision 17 is made in the whole thickness of the welding layer 6 and can affect at least one second stretch of the thickness of the front layer 7. In particular, the second stretch of the thickness of the front layer 7 is larger than the first stretch of the thickness of the front layer 7. In other words the incision 12 has a lower depth than the further incision 17.

In the event that the intermediate layer 8 is not continuous, the separation line 16 can advantageously extend between the portion free from removable self-adhesive 15 and the adhesion portion 9. In other words the separation line 16 defines in the welding layer a gripping portion 18 that has at least one stretch affected by the adhesion portion 9.

Preferably the gripping portion 18 is provided in at least one corner of the closing element 5 or one of its opening flaps. According to embodiments not illustrated, the gripping portion may be provided in any portion of the closing element 5. For example, for circular or elliptical containers, the gripping portion may be provided in any position of the contour of the closing element 5.

Preferably the incision 12 and/or the further incision 17 are obtained through die cutting.

In use the container 1 is closed by the closing element 5 through welding the welding layer 6 to the free edge 4.

With reference to the embodiment illustrated in FIGS. 1-7, to open the container 1 the closing element 5 is grasped at the gripping portion 18 of the welding layer 6. By pulling the closing element 5 upwards the further incision 17 allows only the front layer 7 to be lifted along with the gripping portion 18 while the welding layer 6, and in particular the welding portion 13, remains coupled to the free edge 4 of the container 1.

Proceeding with the lifting action of the closing element 5, the front layer 7 is detached from the welding portion 13 of the welding layer until it meets the opening line 10. At this point the opening portion 14 is detached from the welding portion 13. The opening portion 14 remains coupled to the front layer 7. Proceeding with the opening of the closing element 5, the detachment between the welding portion 13 and the opening portion 14 generates the access window 11. In the event that the opening line 10 defines an open perimeter, the front layer 7 coupled with the opening portion 14 of the welding layer 6 remains connected to the rest of the closing element 5.

Preferably the welding portion 13 extends towards the inside of the free edge 4 defining a striking surface for the adhesion portion 9 which extends beyond the opening portion 14. For simplicity in FIG. 2 9a indicates a removable self-adhesive edge corresponding to the adhesion portion 9 which extends beyond the opening portion 14. In this way the container 1 can be reclosed various times simply by pressing the front layer 7 and the adhesion portion 9, in particular the removable self-adhesive edge 9a which surpasses the opening portion 14, against the welding portion 13.

According to an embodiment not illustrated, the portion free from removable self-adhesive 15 can be omitted, in particular in the event that a further incision 17 is provided. In this case an edge of the closing element 5 is grasped in proximity to the further incision 17. By pulling the closing element 5 the welding portion 13 is first detached which remains coupled to the free edge 4 and, continuing to pull the closing element 5, the opening portion 14 is detached, which remains associated to the front layer 7.

According to a further embodiment, not illustrated, the further incision is not made, in particular in the event that a portion free from removable self-adhesive 15 is provided. In this case the front layer 7 is grasped in the part corresponding to the portion free from removable self-adhesive 15 and it is pulled until the opening portion 14 is detached from the welding portion 13.

The appended figures show a rectangular shaped container. Obviously different shapes are possible, for example square or circular. Likewise, also the shapes of the opening lines, the welding portion and the other characteristics of the container may be different from what is shown. For example the shape of the opening line may be different from the perimeter of the container.

Figure 6:
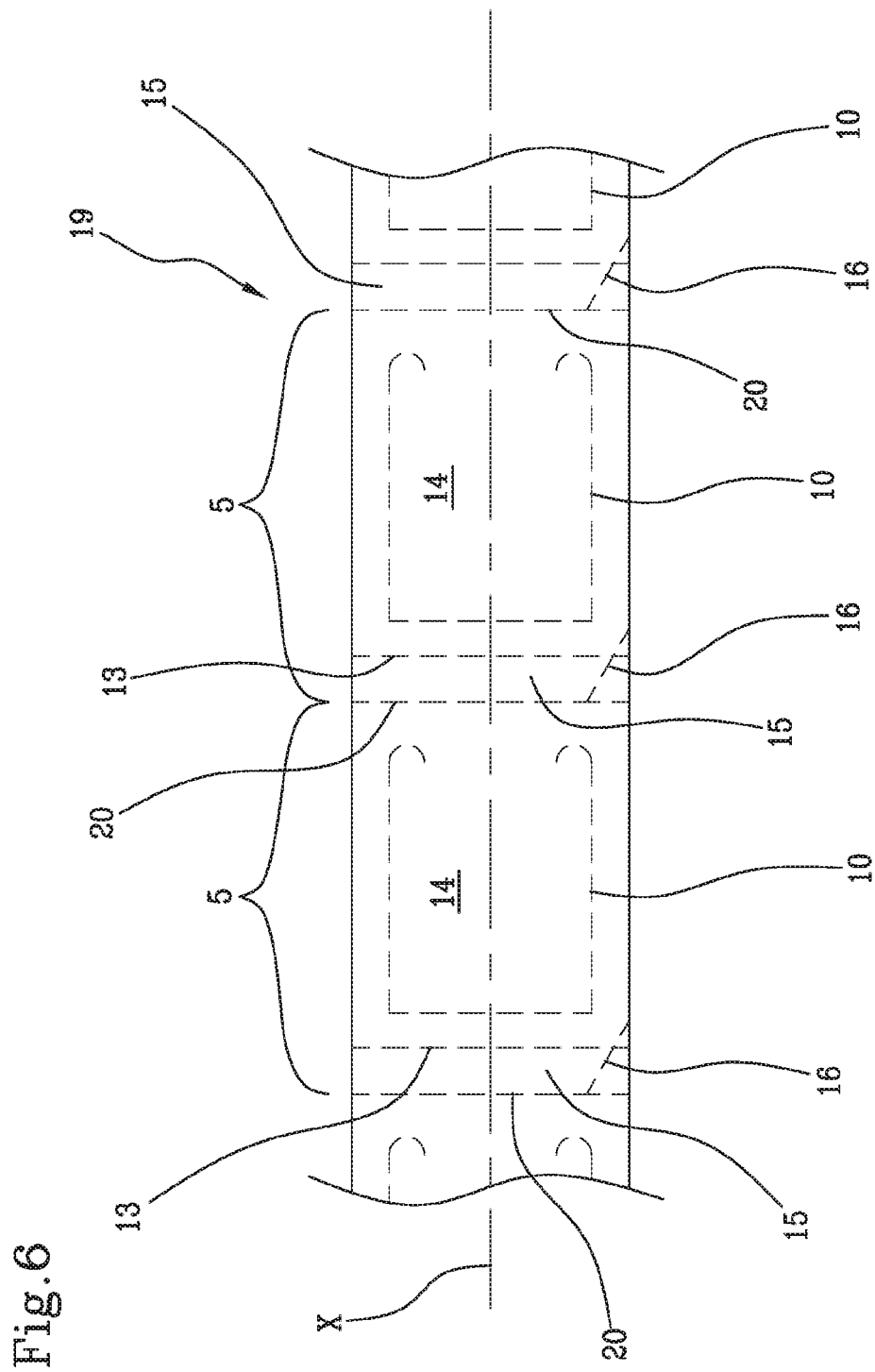
FIG. 6 is a schematic plan view of a first embodiment of a portion of laminate according to the present invention.
Figure 7:
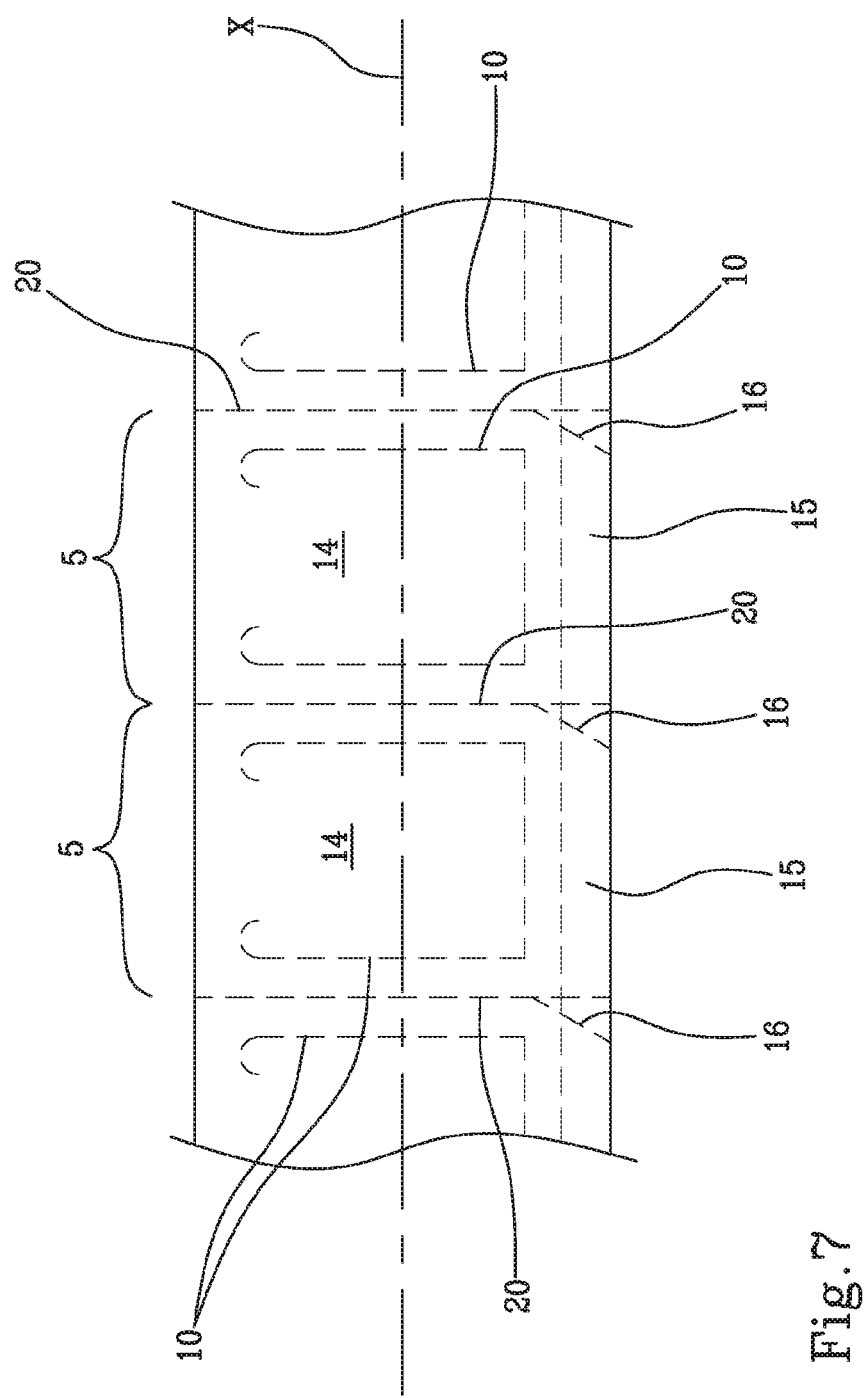
FIG. 7 is a schematic plan view of a second embodiment of a portion of laminate according to the present invention.

The container 1 according to the present invention is preferably obtained from a laminate 19 comprising at least the first layer or welding layer 6 adapted to be welded to the free edge 4 of the containment wall 2 and at least one second layer or front layer 7 arranged above the welding layer and preferably adapted to define an outer surface of the container. A plan view of two possible embodiments is illustrated in FIGS. 6 and 7.

The laminate according to the embodiments described above has one or more of the characteristics described with reference to the closing element 5.

In particular the laminate may be made as an elongated element that extends along a longitudinal direction X, for example adapted to be wound onto a reel. In this case both the welding layer and the front layer have a prevalent extension along respective longitudinal directions and form the continuous laminate extending along its own longitudinal direction.

In this configuration, a plurality of closing elements 5 can be obtained from one laminate, by splitting the laminate itself into crops of pre-established length, before or after the coupling with the containment wall 2. In FIGS. 6 and 7, 20 indicates the lines along which the laminate will be cut to form closing elements 5.

According to a possible embodiment the laminate comprises a plurality of opening lines 10 each adapted to define an access window 11 of a closing element 5 of a container 1.

When envisaged, the portion free from removable self-adhesive 15 can be arranged at one side of the laminate and extends continuously along the longitudinal direction X (FIG. 7).

Alternatively, a plurality of adhesion portions 9 can be provided alternating along the longitudinal direction of the laminate with portions free from removable self-adhesive 15 arranged transversally to the longitudinal direction of the laminate (FIG. 6).

Alternatively, according to an embodiment not illustrated, the intermediate layer 8 is made according to drawing by defining appropriate adhesion portions 9 and portions free from removable self-adhesive 15 made according to drawing based on, for example, the shape/size of the container and/or the access window and/or the other characteristics described above with reference to the closing element 5.

In the event that the closing element 5 comprises a separation line 16, the laminate may comprise a plurality of separation lines 16, each at a closing element 5.

In this case, each welding portion 13 adapted to be welded to the container is arranged between at least one portion of an opening line 10 and a separation line 16.

The laminate 19 for making closing elements for containers or receptacles may be made through a production method in accordance with the present invention.

According to such a method it is envisaged to arrange the welding layer 6 and the front layer 7 and to couple them through the intermediate layer of removable self-adhesive 8 spread onto at least the adhesion portion 9.

According to such a method it is also envisaged, preferably after coupling the welding layer 6 with the front layer 7, to make the incision 12 in at least one stretch of the thickness of the welding layer 6 along the opening line 10 adapted to define the access window 11. The incision 12 divides the welding layer 6 between a welding portion 13 adapted to be welded to the container and an opening portion 14 corresponding to the access window 11, with reference to an assembled configuration on the container. The incision 12 is made so as to allow the detachment of the opening portion 14 from the welding portion 13 while the closing element 5 is opened. The incision 12 defines an opening line 10 of any shape and size for example based on the shapes/sizes of the container. In particular the opening lines 10 may be made according to drawing based on the characteristics of the final product.

Preferably providing the welding layer 6 and the front layer 7 comprises continuously making such layers advance along respective longitudinal directions, for example, by unwinding them from respective reels.

In this case, the two layers are continuously coupled by forming a continuous laminate that extends along its own longitudinal direction and making a plurality of opening lines 10 along such longitudinal direction, each adapted to define an access window 11 of a closing element 5 of a container 1.

When spreading the intermediate layer 8 it is possible to leave at least one portion free from removable self-adhesive 15. In the event of continuous laminate the portion free from removable self-adhesive 15 can be made at one side of the laminate so that it extends continuously along the longitudinal direction of the laminate itself. Alternatively the intermediate layer 8 of removable self-adhesive is spread onto a plurality of adhesion portions 9 alternating along the longitudinal direction of the laminate with portions free from removable self-adhesive 15 arranged transversally to the longitudinal direction. Each portion free from removable self-adhesive 15 preferably delimits a closing element 5. According to a further embodiment the intermediate layer 8 of removable self-adhesive is spread according to drawing as previously described.

If envisaged, the further incision 17 can be made between the portion free from removable self-adhesive 15 and the adhesion portion 9. For continuous laminate, it is envisaged to make a plurality of separation lines 16, each at a closing element 5. In this case each welding portion 13 adapted to be welded to the container is arranged between at least one portion of an opening line 10 and a separation line 16. The further incision 17 defines a separation line 16 of any shape and size for example based on the shapes/sizes of the container. In particular the separation lines 16 may be made according to drawing based on the characteristics of the final product.

Potentially for a same closing element 5 two or more further incisions 17 can be made and therefore two or more separation lines 16, for example, each at a corner of the container.

Figure 8:
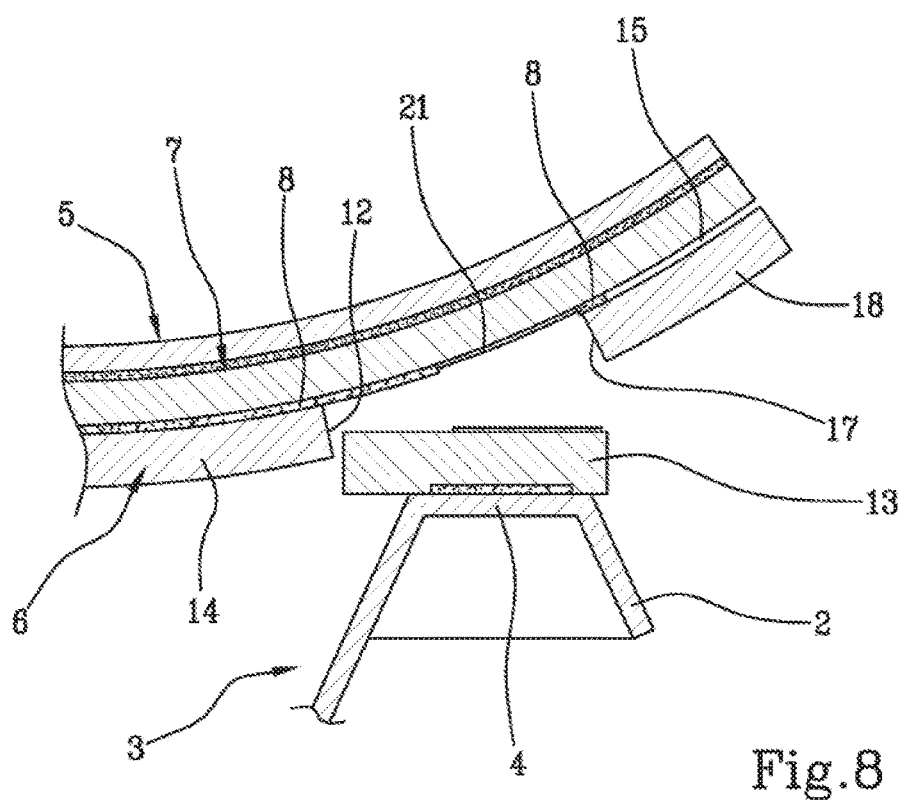
FIG. 8 is a sectional view of a detail of a container according to a further embodiment of the present invention.

With reference to FIG. 8 a further embodiment has been illustrated in which the elements in common with the embodiment of FIGS. 1-7 have been indicated with the same reference number. The embodiment of FIG. 8 differs from those previously described in that it comprises an additional adhesive layer 21 arranged between the welding layer 6 and the front layer 7 preferably at the welding portion 13. The additional adhesive layer 21 is configured to create a sealing of the container in particular adapted to define a barrier to the inert gases introduced into the container itself and as protection for pasteurised products or the like.

Preferably the additional adhesive layer 21 comprises a heat activatable adhesive, which welds the welding layer 6 and the front layer 7 with a higher adhesion force with respect to the intermediate layer 8. Preferably the additional adhesive layer 21 is made with a thermo lacquer spread according to drawing between the welding layer and the front layer and activatable when the welding layer is welded onto the containment wall 2.

Advantageously the additional adhesive layer 21 is arranged within the adhesion portion 9 at the welding portion 13 of the welding layer 6.

The use of the container is the same as that previously described with the difference that the additional adhesive layer 21 is torn when opened. The adhesion portion 9 allows the container to be reclosed as previously described.

In accordance with any of the embodiments described, the welding layer 6 and/or the front layer 7 can be made of a single or multiple layer.

The invention claimed is:

1. A method for producing a laminate for closing elements for containers, said laminate comprising a welding layer adapted to be welded to a free edge of the container and a front layer adapted to define an external surface of said container, the method comprising:
- providing said welding layer and said front layer;
- coupling said welding layer to said front layer through an intermediate layer of removable self-adhesive spread at an adhesion portion of mutually coupled surfaces of said welding layer and of said front layer;
- making an incision in a portion of a thickness of the welding layer along an opening line adapted to define an access window of a closing element,
- wherein said incision divides the welding layer between a welding portion adapted to be welded to the container and an opening portion corresponding to said access window, with reference to an assembled configuration on the container, said incision being made so as to allow a detachment of said opening portion from said welding portion while said closing element is opened;
- spreading said intermediate layer of removable self-adhesive onto said adhesion portion leaving a portion free from removable self-adhesive,
- making a further incision in a portion of the thickness of the welding layer along a separation line, and arranging said welding portion adapted to be welded to the container between a portion of said opening line and said separation line,
- wherein said separation line extends between said portion free from removable self-adhesive and said adhesion portion.

2. The method according to claim 1, wherein said welding portion surrounds said opening line and said opening portion.

3. The method according to claim 1, wherein providing said welding layer and said front layer comprises continuously making said welding layer and said front layer advance along a common longitudinal direction by unwinding said welding layer and said front layer from respective reels;
- continuously coupling said welding layer to said front layer to form a continuous laminate extending along the longitudinal direction,
- and making a plurality of opening lines along said longitudinal direction each adapted to define an access window of a closing element of a container.

4. The method according to claim 1, wherein said adhesion portion of the intermediate layer covers said opening portion and extends at least partially onto said welding portion of said welding layer, beyond said opening line with respect to said opening portion, said portion free from removable self-adhesive corresponding to a part of said welding portion.

5. The method according to claim 1, wherein said further incision extends through an entirety of the thickness of the welding layer and affects a second portion of the thickness of the front layer.

6. The method according to claim 1, comprising applying an additional adhesive layer between the welding layer and the front layer at the welding portion, said additional adhesive layer being configured to connect to the welding portion to create a sealing of the container.

7. The method according to claim 1, wherein the welding portion defines a closed perimeter and the opening line defines an open perimeter.

* * * * *